United States Patent
Vaisanen et al.

(10) Patent No.: US 6,356,967 B1
(45) Date of Patent: Mar. 12, 2002

(54) ADDING PLUG-IN UNIT SLOTS TO A HIGH CAPACITY BUS

(75) Inventors: Pasi Vaisanen, Espoo (FI); Alex Grigoruk, Montmorency (AU)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/420,663

(22) Filed: Oct. 19, 1999

Related U.S. Application Data

(63) Continuation of application No. PCT/FI98/00349, filed on Apr. 20, 1998.

(30) Foreign Application Priority Data

Apr. 22, 1997 (FI) .................................................. 971718

(51) Int. Cl.[7] .............................................. G06F 13/38
(52) U.S. Cl. ...................... 710/128; 710/107; 370/402
(58) Field of Search ................... 710/128, 131, 710/132, 124, 117, 126, 127, 129, 30, 100, 101, 102; 370/407, 402, 403, 404, 441, 443, 442, 458

(56) References Cited

U.S. PATENT DOCUMENTS

| | | | |
|---|---|---|---|
| 4,777,615 A | | 10/1988 | Potash |
| 4,954,949 A | | 9/1990 | Rubin |
| 5,128,937 A | * | 7/1992 | Khalil .......................... 370/440 |
| 5,157,775 A | * | 10/1992 | Sanger ........................... 711/5 |
| 5,440,698 A | * | 8/1995 | Sindhu et al. ............... 709/225 |
| 5,586,271 A | * | 12/1996 | Parrett ......................... 710/103 |
| 5,732,076 A | * | 3/1998 | Ketseoglou et al. ......... 370/347 |
| 5,764,924 A | * | 6/1998 | Hong .......................... 710/101 |
| 5,887,144 A | * | 3/1999 | Guthrie et al. .............. 710/101 |
| 6,067,296 A | * | 5/2000 | Heering et al. ............. 370/363 |
| 6,081,863 A | * | 6/2000 | Kelley et al. ............... 710/129 |

FOREIGN PATENT DOCUMENTS

| | | |
|---|---|---|
| CA | 1301261 | 5/1992 |
| FI | 953010 | 6/1995 |
| WO | WO 97/02533 | 7/1996 |
| WO | WO 97/00481 | 1/1997 |

\* cited by examiner

Primary Examiner—Robert Beausoleil
Assistant Examiner—X. Chung-Trans
(74) Attorney, Agent, or Firm—Altera Law Group

(57) ABSTRACT

The objective of the invention is a backplane bus especially for equipment cabinets which allows an increase of the bus transmission capacity and this way a considerable increase in the number of plug-in units connected to the bus. The bus is divided physically into two bus segments A and B. The segments are combined into one logical bus by bridging, but so that the bridging function is not performed on the bus but with a plug-in unit (4A, 4B) which is connected to the bus at the point of division and which performs the bridging functions. The plug-in unit makes sure that when a plug-in unit located in the first half of the bus is transmitting to a plug-in unit located in the second half of the bus, the transmission time slot will be properly mapped into the reception time slot of the target plug-in unit in the second bus and vice versa. Hereby the time slot in the first half and the target time slot in the second half form a logical channel which may be allocated on the same principles as a one-timeslot channel.

22 Claims, 3 Drawing Sheets

ADDING PLUG-IN UNIT SLOTS TO A HIGH CAPACITY BUS

This is a continuation of PCT/FI98/00349 filed Apr. 20, 1998.

FIELD OF THE INVENTION

This invention concerns such a data transmission bus in plug-in unit and rack systems wherein plug-in units are connected to the bus when pushed into the rack, so that the plug-in units can be in data transmission connection with one another through the bus.

BACKGROUND OF THE INVENTION

Relatively complex distributed equipment environments, such as telecommunication equipment and computer systems, use different backplane buses, the purpose of which is to connect the different units electrically and mechanically to each other and to allow prompt communication between the units. The buses may be passive buses or they may be active ones, wherein the peripheral logic speeds up voltage level changes in the bus and thus makes the bus operate faster.

Backplane buses may also be used in systems formed by several hardware racks, such as e.g. in the node device of a digital telecommunication system, where data and clock signals must be transmitted between hardware racks. For timing, digital systems need synchronising signals commonly called clocks. E.g. in such backplane bus systems wherein exactly simultaneous timing information is required, distribution of clocks is carried out in the way shown in FIG. 1 by constructing a star-like transmission line network containing several parallel transmission lines 11 of equal length. For each transmission line there is the line's own transmitter 12, to which the clock is supplied from a clock source 13 common to all transmission lines. At the end of each transmission line there is the line's own receiver 14 for reception of the clock. Drawbacks of this kind of solution (caused by several parallel transmitter/receiver couples) are relatively high costs and difficult implementation of the construction among other equipment, e.g. inflexibility in situations where changes occur. For example, the place of an individual transmitter can not be moved anywhere in practice, because cabling can not be drawn from anywhere so that the transmission lines will be of equal length.

If exactly simultaneous timing information is not a necessary feature, Bus Transceiver Logic (BTL) circuits have been used in backplane buses e.g. in a structure according to the Futurebus standard, wherein one transmitter supplies a common bus to which several receivers are connected. A first drawback of this solution is that propagation delays are different with different receivers. Under these circumstances, the timing information is not sufficiently exact for all applications, but the solution is suitable in those cases only where exactly simultaneous timing information is not a necessary feature. In addition, the power consumption is high in the system due to parallel termination at both ends of the bus.

Due to increasing clock frequencies and a growing complexity of the equipment, backplane buses have become one of the major factors limiting system performance. If those parameters which are critical to the backplane bus, that is, delay, noise and noise tolerance, are poorly predicted, then the performance determined for the system will not be achieved. The specific impedance of the backplane bus is an important factor affecting system performance and design. It affects important parameters such as propagation delay, noise tolerance, connection noise, internal capacitance and cross-talk. In theory, the specific impedance will not affect the propagation delay of a signal propagating on the bus, but taking into account those capacitances of equipment connected to the bus which connect in parallel with the specific impedance and thus increase the total impedance, a slower bus operation will result.

With a reduced specific impedance the internal bus capacitance and thus the signal rise time will grow. A rise time delay is thus mainly caused by the backplane bus, but it is also caused by the charging delay of plug-in unit controllers connected to the backplane bus which increases the total delay.

FIG. 2 shows a bus B, which is located in the rear part of an equipment cabinet and to which N plug-in units are connected through transmitter/receiver blocks. The bus end mounts a plug-in unit supplying such a master clock to the bus with which the other plug-in units of the bus will synchronise. Due to the grounds mentioned above, the bus has a certain clock frequency so that at frequencies exceeding this delays will grow so much that unit C, which is located at the other end of the bus and to which unit A at the opposite end sends a signal in its transmission time slot, will receive the signal so late that a part of the signal or the whole signal will drift outside the reception time slot.

By using a quick bus interface in the plug-in units, so-called GTL technology, the bus clock frequency may be increased to some extent. The Gunning Transceiver Logic (GTL) using Low-Voltage-Swing (LVS) CMOS transistors has been developed especially to allow integration of transmitter/receiver for Very Large-Scale Integration (VLISI) and ASIC circuits instead of the transmitter/receiver being a separate module as in traditional plug-in units. By using GTL technology a maximum number of ten plug-in units may be connected to the passive bus B located in the rear part of the equipment cabinet.

When using GTL technology, the transmitter/receiver capacitance of the plug-in unit is approximately 10–15 pF. When plug-in units are added so that their number is more than ten, the result is that the bus impedance will vary between 25 and 80Ω, whereby the bus is never fully adapted. In consequence, when the clock pulse amplitude has risen, there will be oscillation caused by interference in the signal, and the units will have to wait until the oscillations have passed by.

It should also be noticed that the master clock located at one end of the bus will cause phase skew of the clock on the long bus.

One solution of problems caused by transmission delays is presented in the applicant's Finnish Patent Application FI-953010, inventor Voutilainen Martti. The idea there is to supply a step-less essentially sinusoidal waveform to the bus through such an adapter circuit which besides adapting the level of the propagating wave essentially at the desired level, also absorbs the reflection returning from the transmission line and at the same time prevents multiple reflections. Such a waveform similar to a standing wave is hereby obtained in the transmission line, which is formed as the sum of the propagating and once reflected wave and which may be used for system timing and also for information transmission. With the method it is possible in practice to eliminate almost entirely that timing difference between different receivers which is caused by propagation delay.

FIG. 3 shows a system in accordance with the patent application mentioned above in its simplest embodiment.

Series resistor R1 is connected to the output of low output impedance sine wave generator 31 so that its opposite pole is connected to transmission line 32, to which receivers 33 of the individual equipment units are connected at different points. Of the individual equipment units ( e.g. of the backplane's plug-in units) the figure shows only the receiver, because equipment units may be of very many different types and because the structure of the equipment unit does not belong within the scope of the invention. The value of series resistance R1 is essentially the same as the effective impedance of the transmission line, that is, the transmission line impedance in the loaded state (receiver circuits connected to the transmission line). The transmission line end is open and, in addition, the length of the transmission line is shorter than one-fourth of the wave length. In the most advantageous case the transmission line length is approximately equal to $\frac{1}{8}^{th}$ of the wave length. The receivers are hereby in an area where the amplitude of the transmission line signal is close to its maximum, irrespective of where they are located on the transmission line. If the transmission line length is close to one-fourth of the wave length, then also the receiver closest to the input end is preferably located at a sufficient distance (approximately at a distance of $\frac{1}{8}^{th}$ of the wave length) from the input point, so that the signal amplitude will be sufficient at the said point.

The propagation delay of the clock can also be compensated for in different ways. It is hereby possible to raise the clock frequency to be used. The Canadian Patent CA-1 301 261, Grover, describes a manner where compensation is performed independently in each plug-in unit or module connected to the bus. Each module contains a clock generator implemented with an analog PLL circuit and all locked to the same common time reference. The arrangement is as follows: a main clock at one end of the bus sends clock pulses to the outgoing line. A return line is in parallel with the line. The line ends remote from the main clock are combined with each other and that end of the return line which is on the main clock side is terminated so that no reflection will occur. Each module is connected both to the outgoing line and at the same point to the return line. When the main clock sends a clock pulse to the outgoing line, the module will identify the pulse edge when it arrives at the module. The pulse propagates to the end of the outgoing line and returns along the return line towards the main clock. The module identifies the edge of the returning pulse as the pulse arrives at the module. The module now knows the exact time between the outgoing and returning pulses. One-half of this time is equal to the module's time distance from the end of the lines. Each module thus knows its time distance from the end of the lines. When a new clock pulse passes by each module, they will in response to the passing-by generate a synchronisation pulse for their respective clock circuit exactly after one-half of the time measured by the module in question. The clock pulse has hereby propagated to the end of the outgoing line. Each module thus generates a synchronisation pulse exactly at the same moment. The clock of each module will hereby be locked to the same time reference, which thus is the moment when the clock pulse of the main clock has propagated to the end of the outgoing line.

When the clock pulse returns along the return line, the module measures the time between outgoing and returning pulses and after one-half of this time it again generates a synchronisation pulse, and the time measurement begins from that moment at which the following clock pulse has passed by the module. The process described above is repeated constantly, whereby the synchronisation pulse of the module's clock circuit is always updated when the main clock pulse has propagated to the end of the outgoing line.

The compensation methods work rather well, but they suffer from the necessary extra cabling and time measurement. This increases costs, which is not acceptable in many cases. By making the bus active, added speed is obtained, but its operation in a trouble situation is a drawback: should an active component break down, then the entire bus must be exchanged.

This invention aims at such a backplane bus especially for equipment cabinets which makes it possible to increase the transmission capacity of the passive bus and this way considerably to increase the number of plug-in units connected to the bus without any such compensations for propagation delay of the clock which would increase costs.

The established objective is achieved with the definitions given in the independent claims.

BRIEF SUMMARY OF THE INVENTION

A passive backplane bus is divided physically into two buses, preferably at the midpoint of the bus. The buses are combined to form one logical bus by bridging, but in such a way that the bridging function is not performed on the bus but on a plug-in unit performing bridging functions and connected to the bus at the breaking point. The plug-in unit will make sure that when a plug-in unit located in the first half of the bus sends to a plug-in unit located in the second half of the bus, the transmission time slot will be properly mapped into the transmission time slot of the plug-in unit in the second half and vice versa. Hereby the time slot in the first half and the target time slot in the second half will form a logical channel, which can be allocated on the same principles as for a channel of one time slot.

In order not to waste plug-in unit slots merely on the bridging function, it is advantageous to locate bridging functions on a master unit, which is the telecommunications unit performing an active function which provides the bus with the master clock. It is especially advantageous to locate the bridging function on two plug-in units, whereby if one fails then the other plug-in unit is able to perform the bridging function, thus making sure that the bus will work without any interruption.

Although bridging causes delay in the communications between the different halves, this is not harmful, because the delay is similar for all connections.

LIST OF FIGURES

The invention will be described referring to the following diagrammatic figures, wherein FIG. 1 shows distribution of clocks on a star-like line;

DETAILED DESCRIPTION OF THE INVENTION

Figure 1:
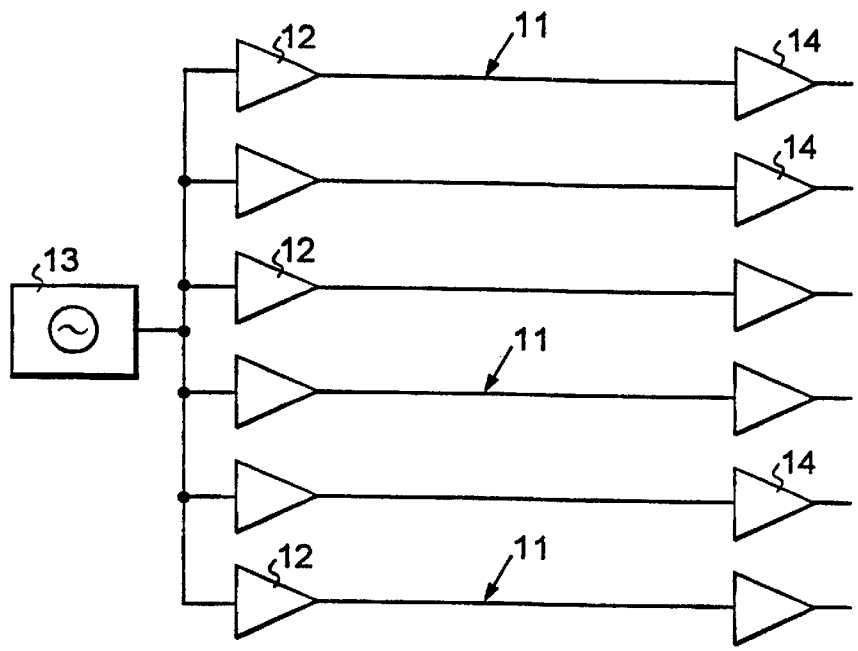
Figure 3:
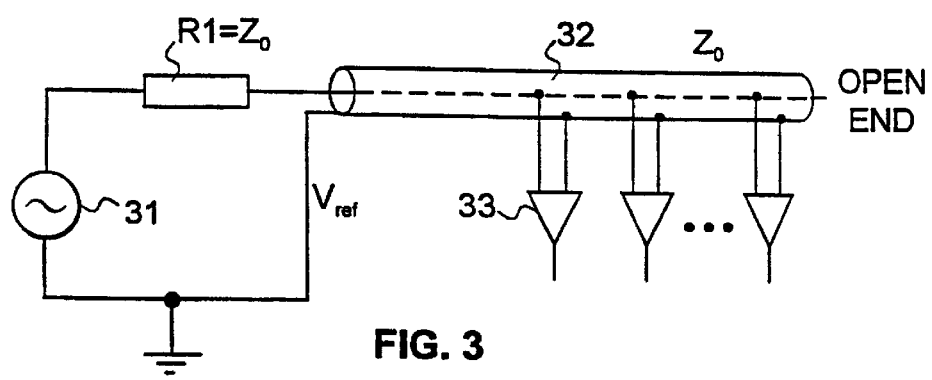
FIG. 3 shows generation of a standing wave on the bus.
Figure 2:
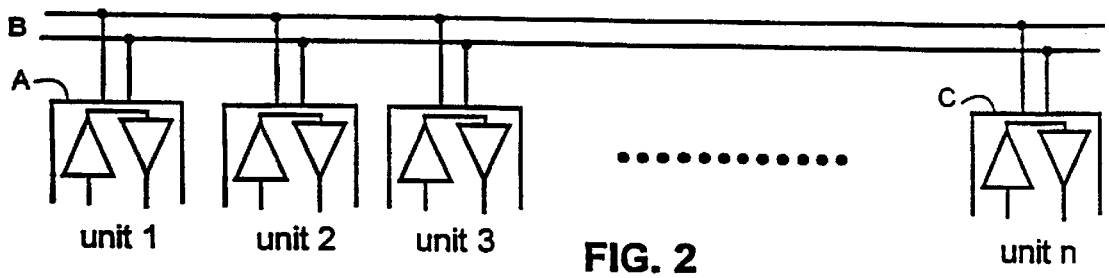
FIG. 2 shows a bus located in the rear part of an equipment cabinet.
Figure 4:
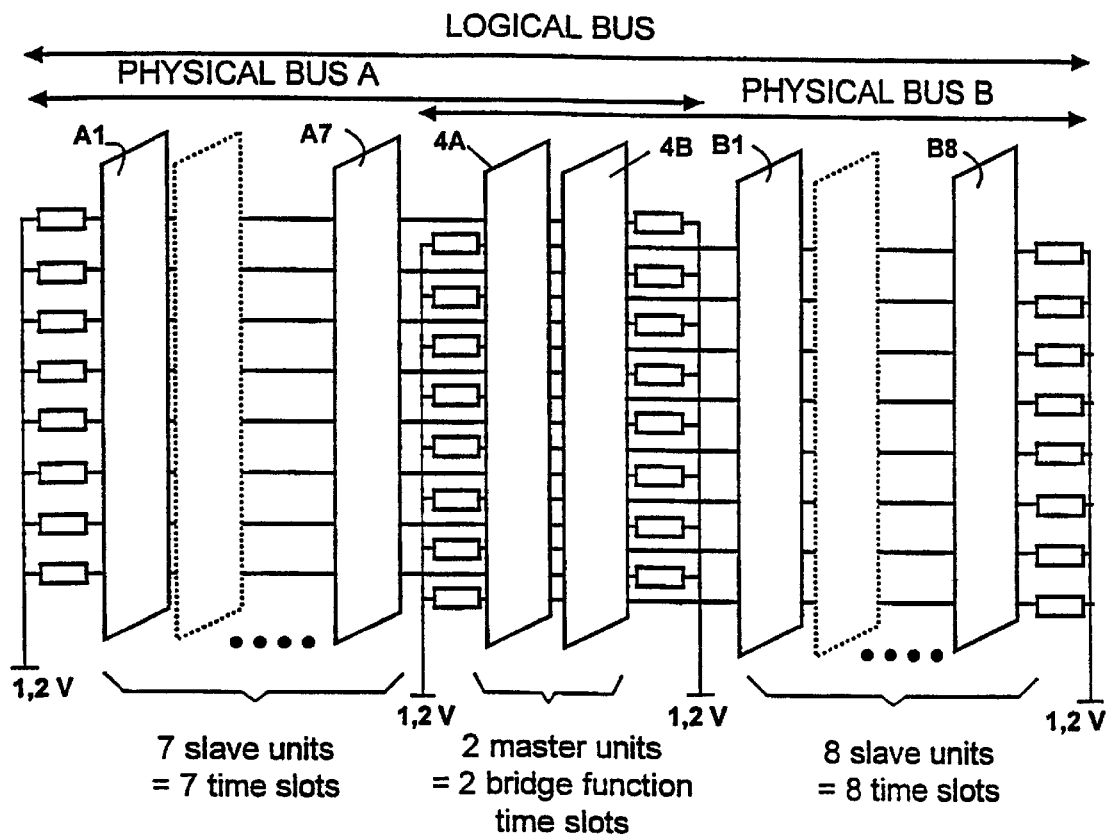
FIG. 4 shows a divided bus.

FIG. 4 shows a bus located e.g. in the rear part of an equipment cabinet and having a physical length slightly shorter than the cabinet width. Circuit units A1, . . . B7 are connected to the bus in a manner known as such. According to the invention, the physical bus is divided into two physically separate segments: bus A and bus B. A certain number of circuit units can hereby be connected to each segment. The circuit units to be connected to bus A are indicated generally by reference number A while the circuit units to be connected to bus B are indicated generally by reference number B. In the separate buses each bus conductor is terminated at each end in a manner known as such with terminal impedance R, through which the conductor gets voltage, a 1.2 V voltage in the figure. The terminal impedance may be e.g. a 50Ω resistance.

In their articulation the bus segments are somewhat overlapping so that the plug-in units 4A and 4B which are to be pushed into the articulation and which perform the bridging are connected to each bus. Through these plug-in units the buses will receive their master clock. The arrangement may be such that plug-in unit 4A supplies the clock to bus A and plug-in unit 4B correspondingly to bus B, or alternatively so that the same plug-in unit (4A or 4B) provides both buses with the clock. If a common clock is used for both bus segments, then the clock skew will become a limiting factor. Skew is no problem when a clock formed with the aid of a standing wave is used. In the use of separate clocks a limiting factor will be delay in data transmission and an additional drawback then is the fact that the ASIC circuits of plug-in units will need more pins.

The most important duty of plug-in units 4A and 4B is to perform the bridging function between bus segments A and B. The plug-in units may advantageously be ordinary plug-in units performing an active telecommunication operation and one or both of which provide the bus with the master clock. Thus no plug-in unit slot need be wasted just for making the bridging. The bridging function, which thus is in addition to the normal functions of the plug-in units, makes sure that the data to be transmitted will be transferred from one bus segment to the other on the pipeline principle. Implementation of bridging is a matter known in the art and circuits for the purpose are available ready-made and as ASIC circuits. Two plug-in units are used here for performing bridging, but one plug-in unit may be used as well. By using two plug-in units with identical tables the advantage is achieved that the bus can be used even if a failure occurs in one plug-in unit, since the other plug-in unit is able alone to perform bridging and to provide both bus segments with the master clock. However, what is essential in the method according to the invention is that the bridging function is performed by an active element located separately from the passive bus.

When a plug-in unit in one bus segment wishes to send data to a plug-in unit in the other bus segment, it will send in its own transmission time slot N. The plug-in unit (plug-in unit 4A or 4B) performing the bridging receives the data and takes it to the pipeline. Of course, the plug-in unit can not bridge and send data to the other bus segment at once in the same time slot N, but it has to wait for the next time slot N+1. When this comes, the bridge plug-in unit forwards the data. Bridging will thus cause a delay of at least one time slot in data transmission between the segments, whereby the data of one segment's time slot will appear one time slot later in the other bus segment. Thus the physical time slot N of a segment (e.g. bus segment A) and the physical time slot N+1 of the other segment (e.g. bus segment B) form a logical time slot which may be allocated on the same principles as for physical time slots.

Bridging of data from one bus segment to the other may be performed in at least two ways: by interleaving time slots between the bus segments and by using a cross-connection function.

Figure 5:
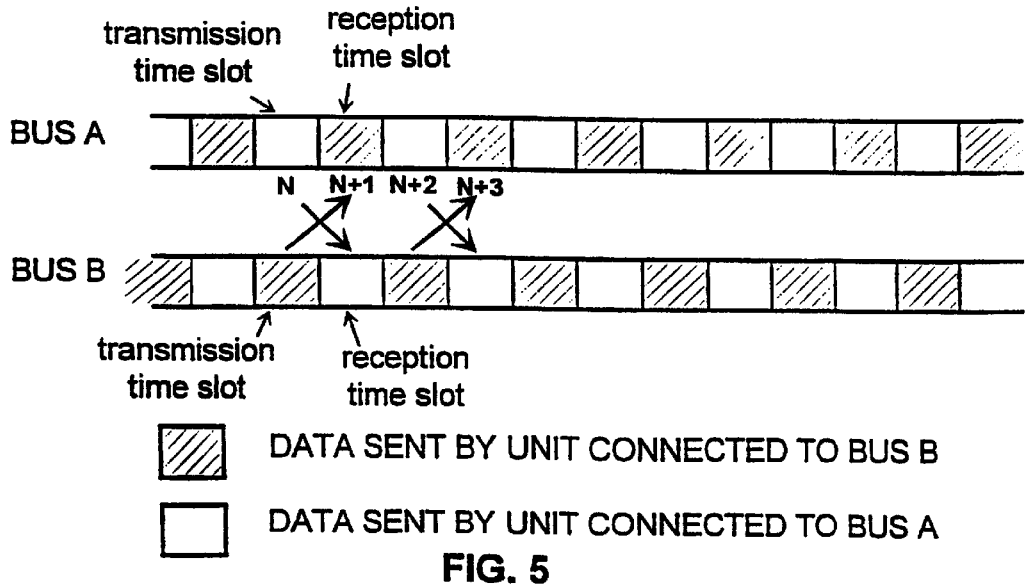
FIG. 5 shows interleaving of time slots.

Interleaving of time slots is outlined in FIG. 5. The upper partial figure shows time slots of bus segments A and the lower partial figure shows time slots of bus segment B. In the beginning of each time slot a clock pulse is sent to the buses either from bridge plug-in unit A or B. The clock pulse arrives exactly at the same moment, so the time slots of both buses are synchronised. Since the bridging function will necessarily cause a delay, the transmission time slots of the buses can not be simultaneous. When the delay is at a minimum of one time slot the result is that units connected to bus A may send only in the time slots shown by a uniform white area and they may receive only in the diagonally lined time slots. Correspondingly, units connected to bus B may send only in the diagonally lined time slots and receive only in the time slots indicated by a uniform white area.

Successive time slots N, N+1, N+2 and N+3 will be examined. Time slot N is the transmission time slot for equipment of both bus A and bus B. A device connected to bus A transmits to a device of bus B in time slot N. Bridging plug-in unit 4A (or 4B) receives the data transmitted in the time slot and transfers it to the pipeline. When time slot N+1 begins, the bridging plug-in unit sends this data to bus B and the target unit connected to this bus receives the data. In a similar manner in time slot N a unit connected to bus B sends data to bus A, the bridging unit receives it and in the next time slot N+1 sends it to bus A, from which the target unit picks up the data. Quite similar functions may take place in time slots N+2 and N+3.

In this manner the logical bus capacity is divided equally to each bus segment. The data transmission rate of the arrangement is equal to the clock frequency and the rate of data supplied to each bus segment of the system is one-half of the clock frequency.

Figure 6:
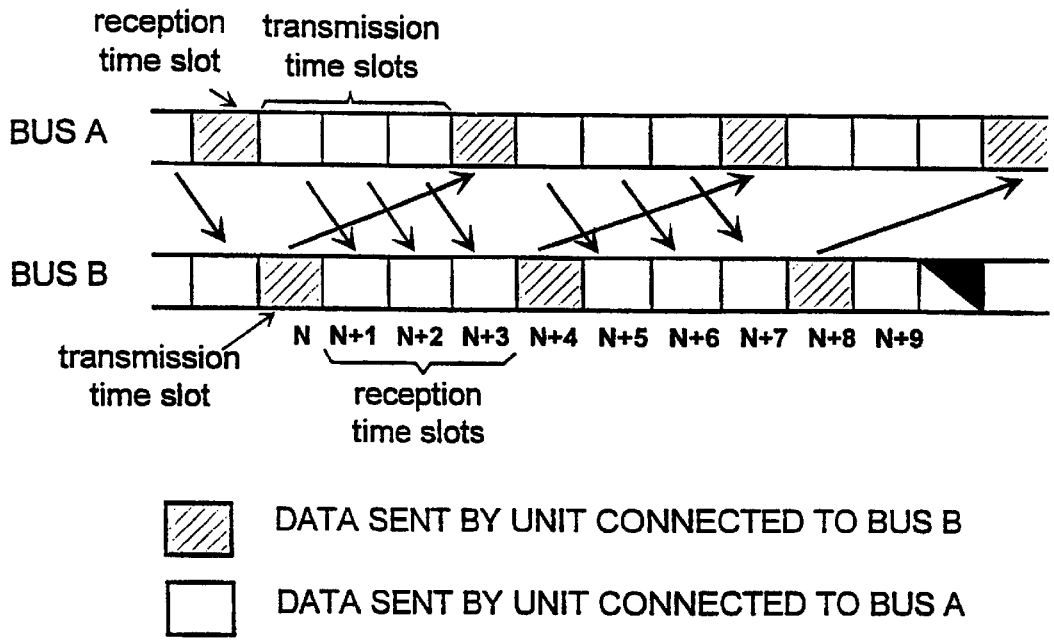
FIG. 6 shows another interleaving of time slots.

In the foregoing example, time slots are interleaved in turns for the bus segments. Interleaving may of course be done otherwise by giving more capacity in one direction than in the other direction. Thus the example in FIG. 6 shows a situation where the transmission capacity from bus A to bus B is higher than in the opposite direction. The total capacity is divided in such a way that the capacity ratio of the buses is 1:3. Units of bus A may send in three successive time slots, in the figure the time slots N, N+1, N+2, whereupon they receive from the unit sending from bus B in time slot N+3 and then again send in the next three time slots. Correspondingly, a unit of bus B may send in time slot N and in the following three successive time slots it will receive from units of bus A.

In the arrangement shown in the figure, the bridging unit delay when going from bus A to bus B must be one time slot, but when going from bus B to bus A the delay is three time slots: data sent in time slot N will be seen in bus A only in time slot N+3.

A cross-connection function may also be used in bridging. Hereby units 4A and 4B, FIG. 4, have similar cross-connection tables. The cross-connection granularity may vary from two blocks all the way to a full cross-connection at time slot level. A two-block cross-connection, where the bus frame is divided into two parts dependent on the transmission requirement, is very simple and gives free hands in the allocation of capacity. The drawback is that it may increase the delay in some cases.

If cross-connection between segments is made at time slot level, a full freedom is achieved in allocation of bus capacity, but then much memory is needed, which is a drawback. If e.g. the bus frame is 8192 time slots and frequency is 65.536 MHz, then 16384 bits will be needed for defining cross-connections between the segments.

Figure 7:
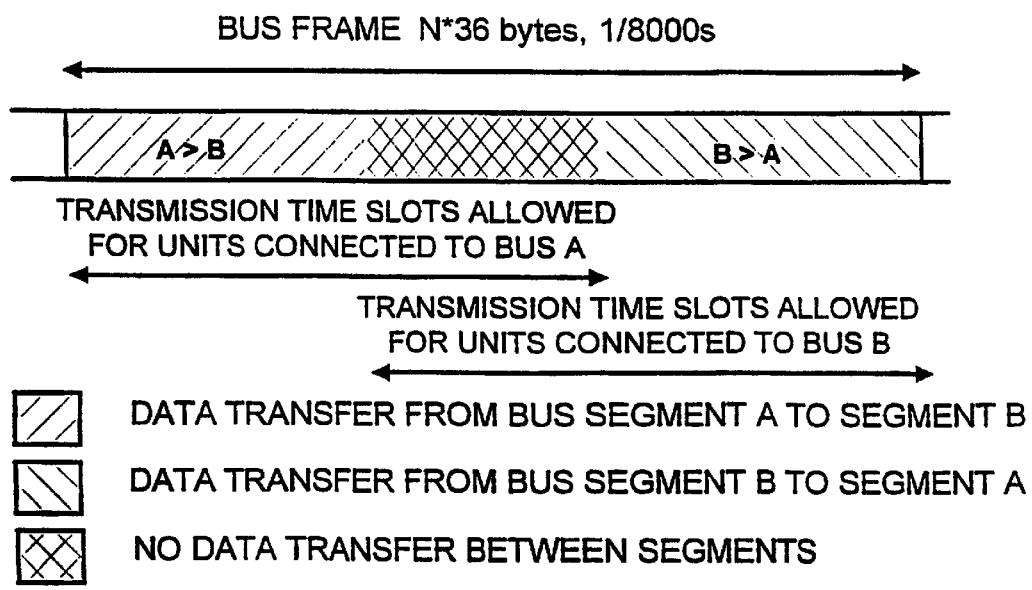
FIG. 7 shows a cross-connection inside a frame.

FIG. 7 illustrates cross-connection in a case where the size of the block to be allocated is 63 bytes. The block is divided into three parts. During the first part of the block, units connected to bus segments A are allowed to transmit and during the final part units connected to bus segment B are allowed to transmit. The allowed areas go partly on top of one another at the middle, and in this area data transmission from one segment to another is not allowed, transmission from one unit to another is only allowed within the segment.

Using cross-connection between segments will add somewhat to the complexity of the system. Besides, in cross-connection tables that pipeline delay must be taken into account which is one time slot between the transmitting and receiving units. For example, if a unit of bus segment A transmits in time slot N, then time slot N+1 must be defined as the reception time slot of a unit connected to bus segment B.

The arrangement according to the invention, wherein a bus is divided into two bus segments, has the drawback that it needs an additional plug-in unit which is connected to two buses and which performs a bridging function. However, it is an advantage that it is possible to use a higher number of plug-in units connected to the backplane bus compared to the conventional case of one bus. When GTL transmitters known as such are used in the transmitters/receivers of plug-in units, the clock frequency of the backplane bus may be increased. The transmitters are specified for a frequency of up to 80 MHz. Since GTL transmitters are of the open drain type, several units may send in the same time slot and any collisions are solved with a suitable bus protocol.

What is claimed is:

1. A method of increasing plug-in unit slots in a high capacity passive bus combining with one another the plug-in units connected to the bus, the method comprising:

dividing the bus into at least two physically separate bus segments in such a way that at a point of division the bus segment conductors will run in parallel over some distance, locating at least one plug-in unit slot at the point of division, locating a circuit unit in the plug-in unit slot to perform a bridging function between the bus segments in a pipeline type manner, whereby the physically separate bus segments will form one logical bus, and wherein the bridging function is performed by using interleaving of time slots, where data received from a first bus segment in a first time slot is transmitted to a second bus segment into a second time slot, which is a time slot immediately following the first time slot, and where the first time slot and the second time slot will form a logical channel so that the data received from the first bus segment in the first time slot is transmitted to the second bus segment into the second time slot, whereby the logical bus capacity is divided equally to each bus segment.

2. The method as defined in claim 1, wherein the bridging function is performed by using cross-connection.

3. The method as defined in claim 2, wherein a bus frame is formed and a first part is reserved in the bus frame for transmission of plug-in units connected to the first bus segment and a second part is reserved for transmission of plug-in units connected to the second bus segment, whereby the first and second part are partly overlapping in time, the bridging function relays data between the bus segments during that time only when the first and second part are not overlapping.

4. The method as defined in claim 1, wherein two circuit units are located at the point of division, each one of which is able to perform the bridging function, whereby if a failure occurs in one unit, the other will perform the bridging function.

5. The method as defined in claim 4, wherein the first circuit unit provides the first bus segment with a master clock while the second circuit unit provides the second bus segment with a master clock.

6. The method as defined in claim 1 wherein the circuit unit located at the point of division provides each bus segment with a master clock.

7. The method as defined in claim 1, wherein such a circuit unit is located at the point of division where a bridging function is added to the normal plug-in unit to be connected to the bus and performing telecommunications.

8. A bus arrangement combining with one another by plug-in units connected to the bus, comprising:

a bus formed of at least two physically separate passive bus segments in such a way that the bus segment conductors run in parallel over some distance, at least one circuit unit at a point where the bus segment conductors run in parallel, which circuit unit performs a bridging function between the bus segments in a pipeline type manner so that the physically separate bus segments form one logical bus, and time slots interleaved, where data received from a first bus segment in a first time slot is transmitted to a second bus segment into a second time slot, which is a time slot immediately following the first time slot, and where the first time slot and the second time slot will form a logical channel so that the data received from the first bus segment in the first time slot is transmitted to the second bus segment into the second time slot, whereby the logical bus capacity is divided equally to each bus segment.

9. The bus arrangement as defined in claim 8, wherein the circuit unit provides both bus segments with a master clock.

10. The bus arrangement as defined in claim 8, wherein the bus includes two circuit units, each of which provides its own bus segment with a master clock.

11. The bus arrangement as defined in claim 10, wherein each circuit unit is able to perform the bridging function independently.

12. The bus arrangement as defined in claim 8, wherein the circuit unit is a normal plug-in unit, which is to be connected to the bus in question and which performs telecommunications and to which a bridging function has been added.

13. Method of increasing plug-in unit slots in a high capacity passive bus combining with one another the plug-in units connected to it, wherein the bus is divided into at least two physically separate bus segments in such a way that at the point of division the bus segment conductors will run parallel over some distance, at least one plug-in unit slot is located at the point of division, a circuit unit is located in the plug-in unit slot to perform a bridging function between the bus segments in a pipeline type manner, whereby the physically separate bus segments will form one logical bus, wherein the bridging function is performed by using cross connection, where a bus frame is formed so that a first part of the bus frame is reserved for transmission of plug-in units connected to the first bus segment and a second part of the bus frame is reserved for transmission of plug-in units connected to the second bus segment, whereby the first and second part are partly overlapping in time and the bridging function relays data between the bus segments during that time only when the first and second part fail to overlap.

14. The method as defined in claim 13, wherein two circuit units are located at the point of division, each one of which is able to perform the bridging function, whereby if a failure occurs in one unit, the other will perform the bridging function.

15. The method as defined in claim 14, wherein the first circuit unit provides the first bus segment with a master clock while the second circuit unit provides the second bus segment with a master clock.

16. The method as defined in claim 13 wherein the circuit unit located at the point of division provides each bus segment with a master clock.

17. The method as defined in claim 13, wherein such a circuit unit is located at the point of division where a bridging function is added to the normal plug-in unit to be connected to the bus and performing telecommunications.

18. A bus arrangement combining with one another by plug-in units connected to the bus, comprising:

a bus formed of at least two physically separate passive bus segments in such a way that the bus segment conductors run in parallel over some distance, at least one circuit unit at a point where the bus segment conductors run in parallel, which circuit unit performs a bridging function between the bus segments in a pipeline type manner so that the physically separate bus segments form one logical bus, and a cross connection, where a bus frame is formed so that a first part of the bus frame is reserved for transmission of plug-in units connected to the first bus segment and a second part of the bus frame is reserved for transmission of plug-in units connected to the second bus segment, whereby the first and second part are partly overlapping in time and the bridging function relays data between the bus segments during that time only when the first and second parts fail to overlap.

19. The bus arrangement as defined in claim 18, wherein the circuit unit provides both bus segments with a master clock.

20. The bus arrangement as defined in claim 18, wherein the bus includes two circuit units, each of which provides its own bus segment with a master clock.

21. The bus arrangement as defined in claim 20, wherein each circuit unit is able to perform the bridging function independently.

22. The bus arrangement as defined in claim 18, wherein the circuit unit is a normal plug-in unit, which is to be connected to the bus in question and which performs telecommunications and to which a bridging function has been added.

\* \* \* \* \*